United States Patent [11] 3,633,819

[72] Inventors William C. Reboulet
 Kettering;
 David C. Werner, Dayton, both of Ohio
[21] Appl. No. 50,419
[22] Filed June 29, 1970
[45] Patented Jan. 11, 1972
[73] Assignee The National Cash Register Company
 Dayton, Ohio

[54] AUTOMATIC REPEAT MECHANISM
 10 Claims, 8 Drawing Figs.
[52] U.S. Cl.................................................. 235/62 F,
   235/60 R
[51] Int. Cl...................................................... G06c 21/00
[50] Field of Search........................................ 235/62 F,
   60 R, 60 TK, 6

[56] References Cited
 UNITED STATES PATENTS

| | | | |
|---|---|---|---|
| 2,337,091 | 12/1943 | Fettig............................ | 235/60.46 |
| 3,329,336 | 7/1967 | Ruys.............................. | 235/62 F |
| 3,431,401 | 3/1969 | Zurbuchen et al............ | 235/6 |
| 3,489,341 | 1/1970 | Placke et al. ................. | 235/60 R |

Primary Examiner—Stephen J. Tomsky
Attorneys—Louis A. Kline, Wilbert Hawk, Jr. and Richard W. Lavin ABSTRACT: A mechanism in a business-orientated machine for repeating a machine operation a predetermined number of times, which number is controlled by a key on the keyboard, the mechanism including an automatic cycle control mechanism which controls the position of a key-representing rack member during consecutive machine operations, and a sequence control mechanism which is controlled by the automatic cycle control mechanism for operating the machine through the predetermined number of cycles of operation.

INVENTORS
WILLIAM C. REBOULET
DAVID C. WERNER

BY

THEIR ATTORNEYS

FIG. 6

INVENTORS
WILLIAM C. REBOULET
DAVID C. WERNER

BY

THEIR ATTORNEYS

AUTOMATIC REPEAT MECHANISM

CROSS-REFERENCE TO RELATED PATENTS

Cycle Control Mechanism for Business Machines, U.S. Pat. No. 3,384,211, issued May 21, 1968, on the application of Dale L. Placke and Kenneth C. Flint.

Programmable Function Control Mechanism for Business Machines, U.S. Pat. No. 3,431,401, issued Mar. 4, 1969, on the application of Louis E. Zurbuchen and Freeland R. Goldammer.

Automatic Cycle Control Mechanism for Business Machines, U.S. Pat. No. 3,489,341, issued Jan. 13, 1970, on the application of Dale L. Placke, David C. Werner, and Marvin D. Frost.

BACKGROUND OF THE INVENTION

In the operation of a cash register or an accounting machine, a situation arises where the keyboard entry needs to be repeated for a predetermined number of times. In order to shorten the time of these repeat operations, various mechanisms have been developed to control such predetermined repeat operations, which mechanisms have included auxiliary keyboards containing the repeat keys, levers which need to be operated during each repeat operation, dials, etc. These mechanisms have been costly and prone to misoperation by the operators. Therefore, it is an object of this invention to provide a predetermined repeat mechanism which is operated from the regular keyboard and is mounted within the machine.

SUMMARY OF THE INVENTION

A mechanism for controlling a business machine by means of which any listing operation can be repeated automatically a predetermined number of times by depression of a regular transaction key on the keyboard. Programmed control members are utilized to control the stopping of transaction differential rack members, which action provides the count for the repeat operation, and also to control the operating mechanism of the machine, which prevents the keyboard from being changed during the repeat operation.

DESCRIPTION OF THE PREFERRED EMBODIMENT

As described above, the invention of the present disclosure is directed to a cash register or an accounting machine of the type disclosed in U.S. Pat. No. 3,384,211, issued May 21, 1968, on the application of Dale L. Placke and Kenneth C. Flint, and in U.S. Pat. No. 3,431,401, issued March 4, 1069, on the application of Louis E. Zurbuchen and Freeland R. Goldammer. The keyboard of the machine in which the present invention is utilized is similar in construction and operation to the keyboards disclosed in U.S. Pat. No. 1,865,147, issued June 28, 1932, on the application of Bernis M. Shipley, and in U.S. Pat. No. 2,616,623, issued Nov. 4, 1952, on the application of Mayo A. Goodbar et al. As shown in those patents, and as well known in this art, depression of a key in a transaction row moves a number of control detent members to an operating position in addition to stopping the primary rack member at a position which represents the transaction key depressed. A secondary rack member is then positioned according to the position of the primary rack member. As disclosed in the above-cited patents, the position of the secondary rack member controls the operation of the indicating mechanism and the printing mechanisms included in the machine, and also selects a line of totalizer elements to be brought into engagement with further differential rack members mounted in the amount key banks, so that the setting of the amount entry differential rack members (primary and secondary) will add into or subtract from the engaged totalizers the particular digit amount represented by the key selected and depressed in the amount bank. Thus the depression of a transaction key controls the operation of various components of the business machine through the movement of various control detents and the position of the primary and secondary transaction rack members.

Figure 1:
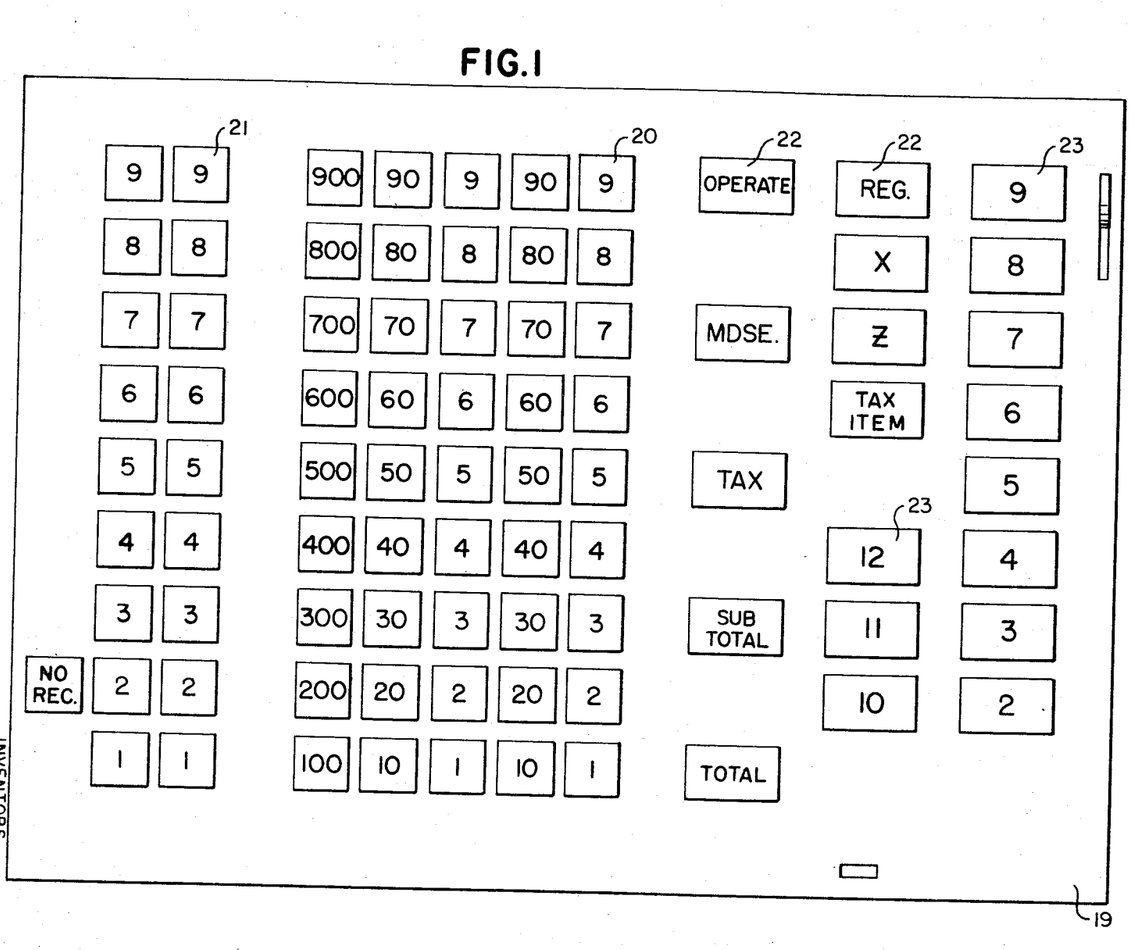
FIG. 1 is a plan view of the keyboard of the present invention.

Referring now to FIG. 1, there is shown a plan view of the keyboard utilized in the present machine. Included in the keyboard 19 are five rows of amount keys 20; two rows of print keys 21, which control the printer to print the numeral corresponding to the key depressed; two rows of transaction keys 22 for controlling the various operations of the machine; and two rows of repeat keys 23, with one of the rows comprising both transaction keys 22 and repeat keys 23. The repeat keys 23 are nonmotorized and are depressed in conjunction with certain of the transaction keys 22, which, when depressed, will initiate an operation of the machine for a predetermined number of times depending on the repeat key that is depressed.

During a machine operation, as disclosed previously, primary and secondary rack members are moved and positioned by the transaction keys that are depressed. These transaction keys include the repeat key 23. These transaction rack members are positioned in the bank of repeat keys (FIG. 1) which constitutes row 1 of the transaction rows, the combined repeat keys 23 and transaction keys 22 which constitute row 2, and the bank of transaction keys 22 which constitute row 3. As will be disclosed more fully hereinafter, these settings of the transaction racks in each of the three banks of transaction and repeat keys are under the control of an automatic cycle control mechanism, with the resulting movement of the rack being transferred to a sequence control mechanism which allows the subsequent operation of the machine to be controlled by preselected transaction keys.

Referring now to FIGS. 2 to 5 inclusive, there are shown various views of the sequence control mechanism used in the present disclosure. Included in the sequence control mechanism is a plurality of drive slides 24 (FIGS. 2, 4, and 5) slidably supported by a front support member 25 and a rear support member 26, which are mounted between a pair of sideplates 27, 28, which in turn are secured to the frame members 30, 31 of the machine. Each drive slide is urged towards the rear of the control mechanism by a spring 32 secured between a stud 33 (FIG. 4), mounted on the slide, and a clip 34 mounted on the rear support member 26. The front portion of each of the drive slides 24 contains an elongate slot 35, within which is positioned a shaft 36, which is mounted between the sideplates 27, 28 (FIG. 2) and which guides the movement of the slides.

Rotatably mounted between the sideplates 27, 28 are eight latching rods 37, four of which are positioned above the drive slide 24 and four below. A spring 38 (FIGS. 4 and 5), secured between oppositely positioned rods 37, urges the rods into engagement with the edge portions of the drive slides 24. Each of the drive slides 24 contains a predetermined number of cutout portions 40 along its upper and lower edges, each cutout portion 40 being positioned adjacent one of the latching rods 37 and also opposite each rod, depending on its application. As will be described more fully hereinafter, movement of the drive slides 24 towards the left, as viewed in FIG. 4, results in the movement of one of the rods 37 into engagement with a cutout portion 40 of its associated drive slide 24, thus latching the slide in its actuated position. The movement of the latching rod into a latching position with its associated slide is predicated on the fact that the rod will sense a cutout portion 40 in each of the other slides 24 mounted in the sequence control mechanism. Thus each of the slides will be programmed to allow only the movement of one slide to release a corresponding rod into a latching position with the slide. The remaining slides would have had a cutout portion positioned opposite the latching rod in order for this to be accomplished. Since there are eight latching rods 37, the slides 24 can be programmed to allow eight different slides to be latched. Normally in a typical operation, far fewer than eight slides are required to be latched.

Figure 3:
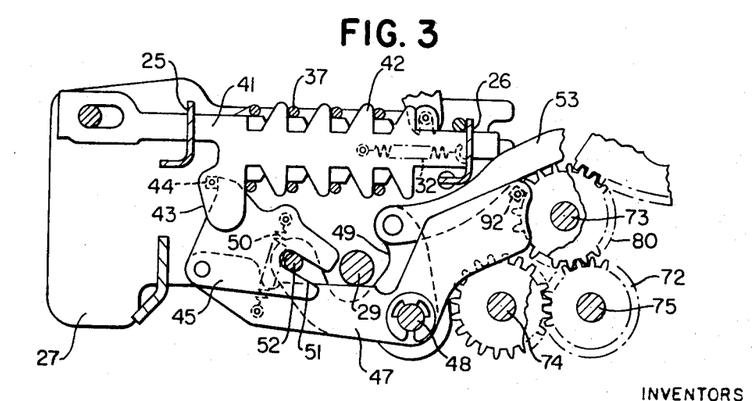
FIG. 3 is a sectional side view taken on the line 3—3 of FIG. 2 and showing the release slide and the feeler arm in a low position.
Figure 4:
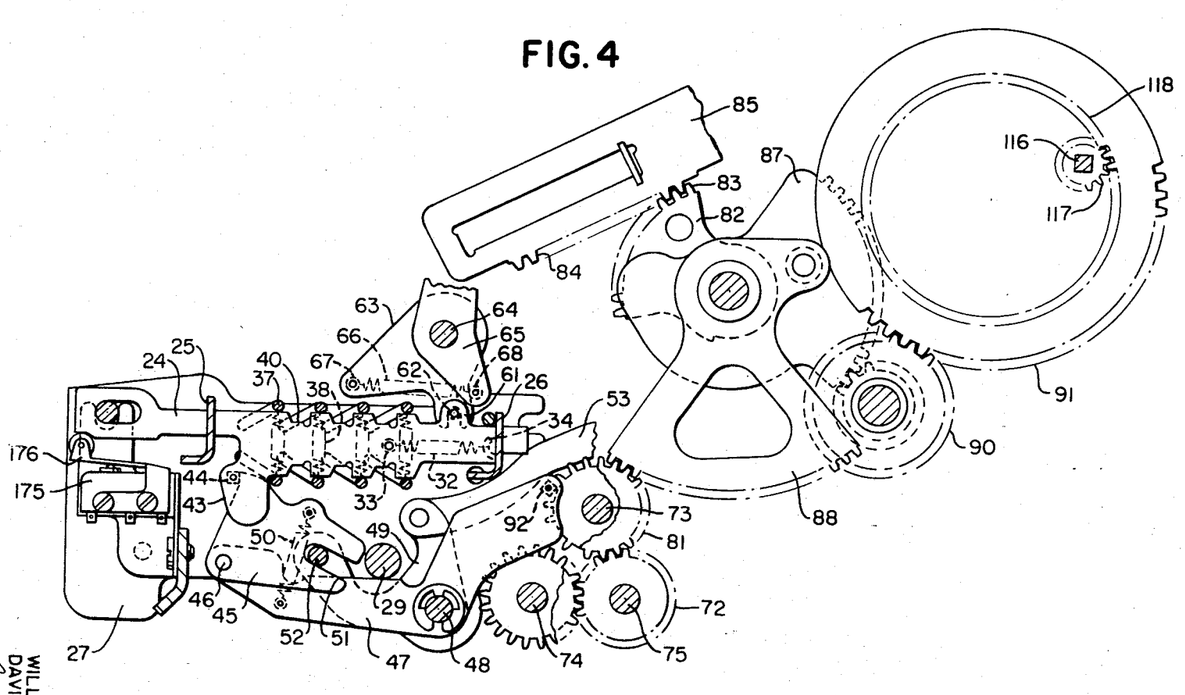
FIG. 4 is a sectional side view taken on the line 4—4 of FIG. 2 and showing the control of the selecting gears by the primary rack member and the drive slide of the sequence control mechanism.

Referring now to FIG. 3, there is shown a release slide 41, which functions to move all of the latching rods 37 out of engagement with the drive slides 24, thereby allowing the slides to be returned to their home position. Each of the release slides 41 has a number of upper and lower cam surfaces 42, which, when the slide is moved to the left, as viewed in FIG. 3, will cam the latching rod 37 outwardly from engagement with the drive slides, thereby allowing the drive slides to move to the right towards their home position by the spring 32. As shown in FIG. 4, there are 12 slides mounted in the sequence control mechanism. These 12 slides will consist of any number of drive slides 24 and release slides 41. The maximum number of drive slides that is allowable is eight, the remaining four being release slides. Under this condition, each release slide is capable of releasing two drive slides. If this ratio of drive slides to release slides is one-to-one, each release slide will release one drive slide. Thus the number and the location of the cam surfaces 42 on the release slides 41 will depend on the number of drive slides to be released and the location of their latching rods.

Mounted on a lower extension 43 of each of the slides 24 and 41 is a stud 44, adjacent to which is located one end of a yoke member 45. The yoke member 45 is rotatably mounted on a stud 46, which in turn is mounted on a selection feeler arm 47. The arm 47 is rotatably mounted on a shaft 48 secured between the side plates 27, 28. A spring 50, mounted between the yoke member 45 and the feeler arm 47, normally urges the yoke member clockwise about the stud 46.

The yoke member 45 has a slot portion 51, within which is located a bail shaft 52 mounted on a pair of arm members 49 rotatably supported on the shaft 48. The arm members 49 rotatably support one end of a link member 53 (FIGS. 2, 3, and 5), the other end of which is rotatably mounted on a cam follower arm 54 rotatably supported on a shaft 55. A spring 56, secured to the bottom of the cam follower arm 54, urges a roller member 57, mounted on the cam follower arm 54, into engagement with a cam 58 secured to a cam line 60. As will be described more fully hereinafter, the cam 58 rocks the feeler arm 47, which controls the movement of its associated drive slide 24 by the yoke member 45.

Figure 5:
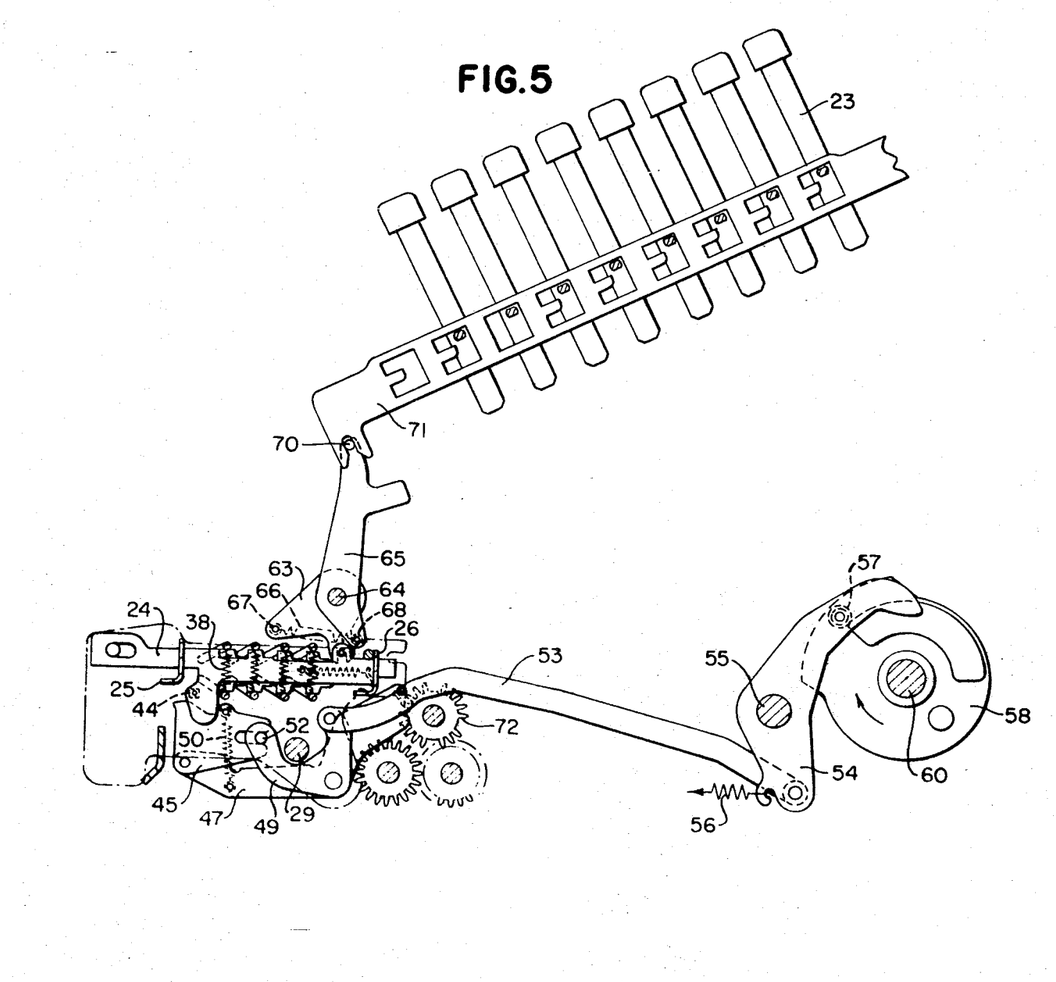
FIG. 5 is a detailed side view of the sequence control mechanism showing the feeler arm in a high position and the cam member for operating the feeler arm.

As shown in FIGS. 4 and 5, each drive slide 24 has mounted on an upper extension 61 a stud 62, which is yoked by one end of an arm 63 rotatably mounted on a shaft 64. Also rotatably mounted on the shaft 64 adjacent to the arm 63 is a lever member 65. A spring 66 mounted between the arm 63 and the lever member 65 on studs 67 and 68 normally urges the stud 68 on the lever 65 into engagement with the arm 63. This action couples the movement of the arm 63 to the lever 65. The other end of the lever 65 has mounted thereon a stud 70 (FIG. 5), which is positioned within the slotted end of a lockout detent 71. As is well known in the art, the detent 71, when actuated by the movement of the associated drive slide, prevents all or some of the transaction keys 22 or repeat keys 23 (FIG. 1) in the row from being depressed, depending on the requirement of the machine operation.

Figure 2:
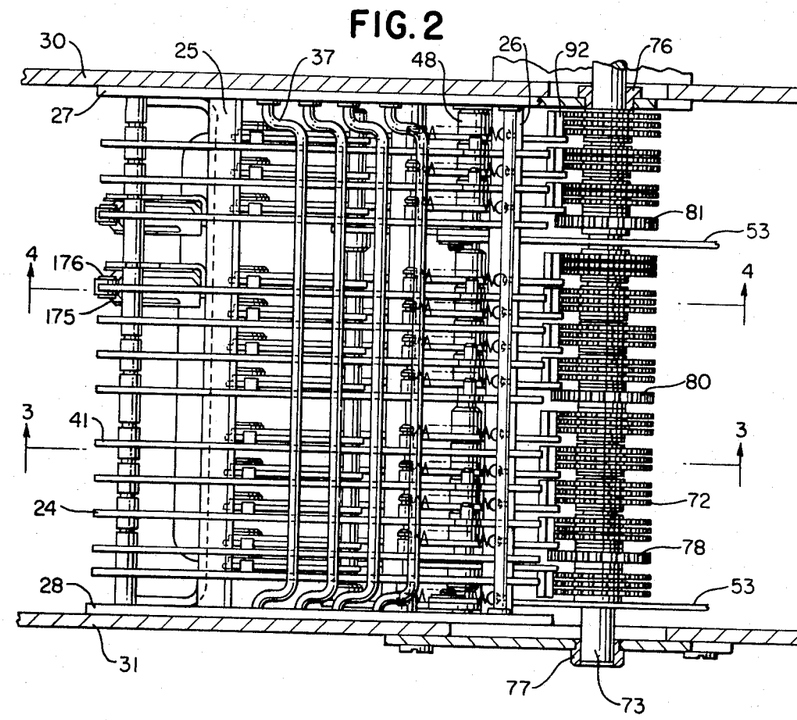
FIG. 2 is a top view of the sequence control mechanism.

Referring now to FIGS. 2 and 4, there are shown, positioned in front of the drive slide 24, three lines of selecting gears 72. Those selecting gears on the shaft 73 (FIGS. 2 and 4) are controlled by the keys in row 2 of the keyboard (FIG. 1), the gears on the shaft 74 are controlled by the keys 23 in row 1, and the gears on the shaft 75 are controlled by the row 3 transaction keys 22. The shafts 73, 74, and 75 are rotatably supported by bushings 76, 77 mounted in the side frames of the machine. As shown in FIG. 2, mounted on the shaft 73 are three gear members 78, 80, and 81. The gear 78 is actuated by the movement of the primary rack in row 1 of the keyboard 19 (FIG. 1) and the gear 80 (FIG. 3) by the primary rack in row 2, while the gear 81 (FIG. 4) is controlled by the primary rack in row 3.

As described more fully in the previously cited Placke et al., U.S. Pat. No. 3,489,341, during the setting of the primary rack commensurate with the key in the transaction row that is depressed, a segment 82 (FIG. 4) is rotated a like distance. The segment 82 has a number of gear teeth 83, which engage gear teeth 84 located on the bottom of the secondary rack 85. Thus the secondary rack 85 is positioned by the segment 82 commensurate with the transaction key that is depressed.

The segment 82 is secured to a shaft 86, on which are also secured a transmission drive segment 87 and a sequence drive segment 88. The transmission drive segment 87 transmits the rotation of the segment 82 to an idler gear 90 and a transaction segment 91, which controls various functions of the machine to be described more fully hereinafter. The sequence drive segment 88 engages one of the gears 78, 80, and 81 mounted on the shaft 73. Thus the gears are rotated a distance commensurate with the transaction key that is depressed. As shown in FIGS. 2 and 4, mounted on the rear portion of the selection feeler arm 47 is a stud 92, which is located adjacent a set of three selecting gears 72 mounted on the shaft 73. Each of these gears is positioned under the control of the gears 78, 80, and 81 in the following manner. The gear 78 (FIG. 2) is positioned under the control of the row 1 transaction key. The gear is rotatably mounted on the shaft 73 and engages an idler gear rotatably mounted on the shaft 75 (FIG. 4). The idler gear transmits the movement of the gear 78 to a gear secured to the shaft 74, which then rotates the shaft 74 a distance commensurate with the rotation of the gear 78. Secured to the shaft 74 are 12 gears, whose rotations are transmitted through idler gears mounted on the shafts 75 and 73. Thus the idler gear in each set of gears 72 located on the shaft 73 corresponding to row 1 will be set by the gear 78 in the above-cited manner. The same arrangement holds good for the gear 81, which is set under the control of row 3. The gear 80, which is set under the control of row 2, is secured to the shaft 73 and sets corresponding gears adjacent to the stud 92 which are secured to the shaft 73. Thus each set of gears which are adjacent to the stud 92 of each feeler arm 47 will be positioned commensurate with the keys that are depressed in transaction rows 1, 2, and 3 of the keyboard. As will be described more fully hereinafter, the feeler arm 47 is actuated by operation of the cam 58 (FIG. 5) to allow the stud 92 to sense the position of the sets of selecting gears mounted on the shaft 73. This sensing operation controls the release of the drive slide 24.

Figure 6:
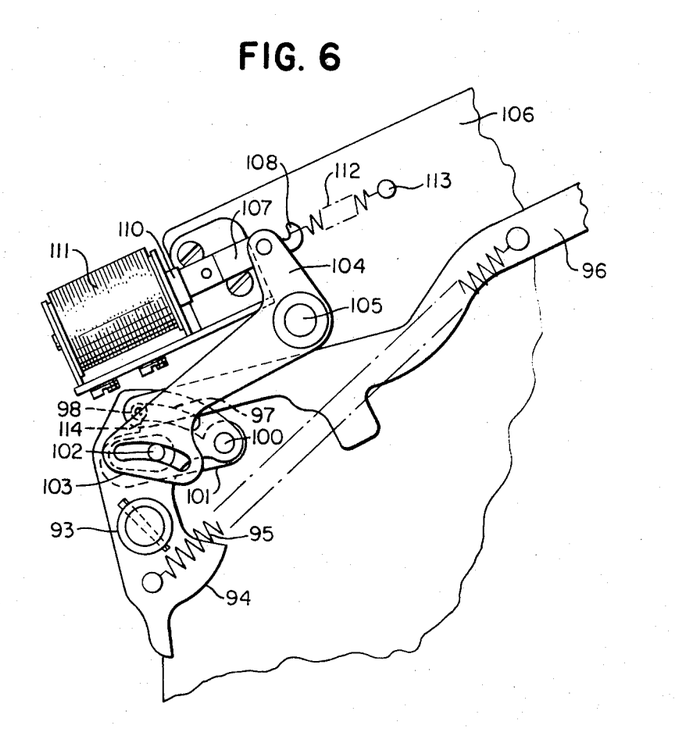
FIG. 6 is a partial detailed side view of the key lock line and its control by the solenoid-operated sequence control mechanism.

Referring now to FIG. 6, there is shown the key lock line 93, which initiates a machine operation when rotated clockwise. Pinned to the key lock line 93 is an arm member 94, which is urged counterclockwise by a spring 95 mounted between the arm member 94 and a restoring link 96. The arm member 94 contains a curved slot 97, within which is positioned a stud 98 mounted on the link 96. Rotatably positioned on a stud 100, mounted on the arm member 94, is a blocking pawl 101, on which is mounted a stud 102 positioned within a slot 103 located in a lever member 104, which in turn is rotatably supported on a stud 105 secured to a side frame 106 of the machine. The other end of the lever member 104 is clipped to a link member 107, which has a hook portion 108 and which is attached to armature member 110 operated by a solenoid 111. The armature member 110 and the link member 107 are normally urged to the right by a spring 112 mounted between the hook portion 108 and a stud 113 mounted on the side frame 106. At the beginning of a machine operation, the stud 98 on the link 96 is normally positioned in front of a blocking surface 114 located on the blocking pawl 101. At the end of the machine operation, the link 96 is normally moved to the right, which results in the clockwise rotation of the pawl 101 due to the action of the stud 98 on the blocking surface 114, the arm 94, and the key lock line 93, thus stopping the operation of the machine. As disclosed in the previously cited Goodbar et al. U.S. patent, clockwise rotation of the key lock line 93 releases all of the depressed amount, print, and transaction keys. As will be described more fully hereinafter, if the solenoid 111 is energized during a machine operation, the counterclockwise movement of the lever 104 rocks the pawl 101 counterclockwise about the stud 100, which removes the blocking surface 114 away from the stud 98. Thus, when the link 96 is moved to the right, the stud 98 moves along the slot 97, and the key lock line 93 remains in its operated position, thus allowing another machine operation to occur. This action locks in the key depressed on the keyboard.

Figures 7, 8:
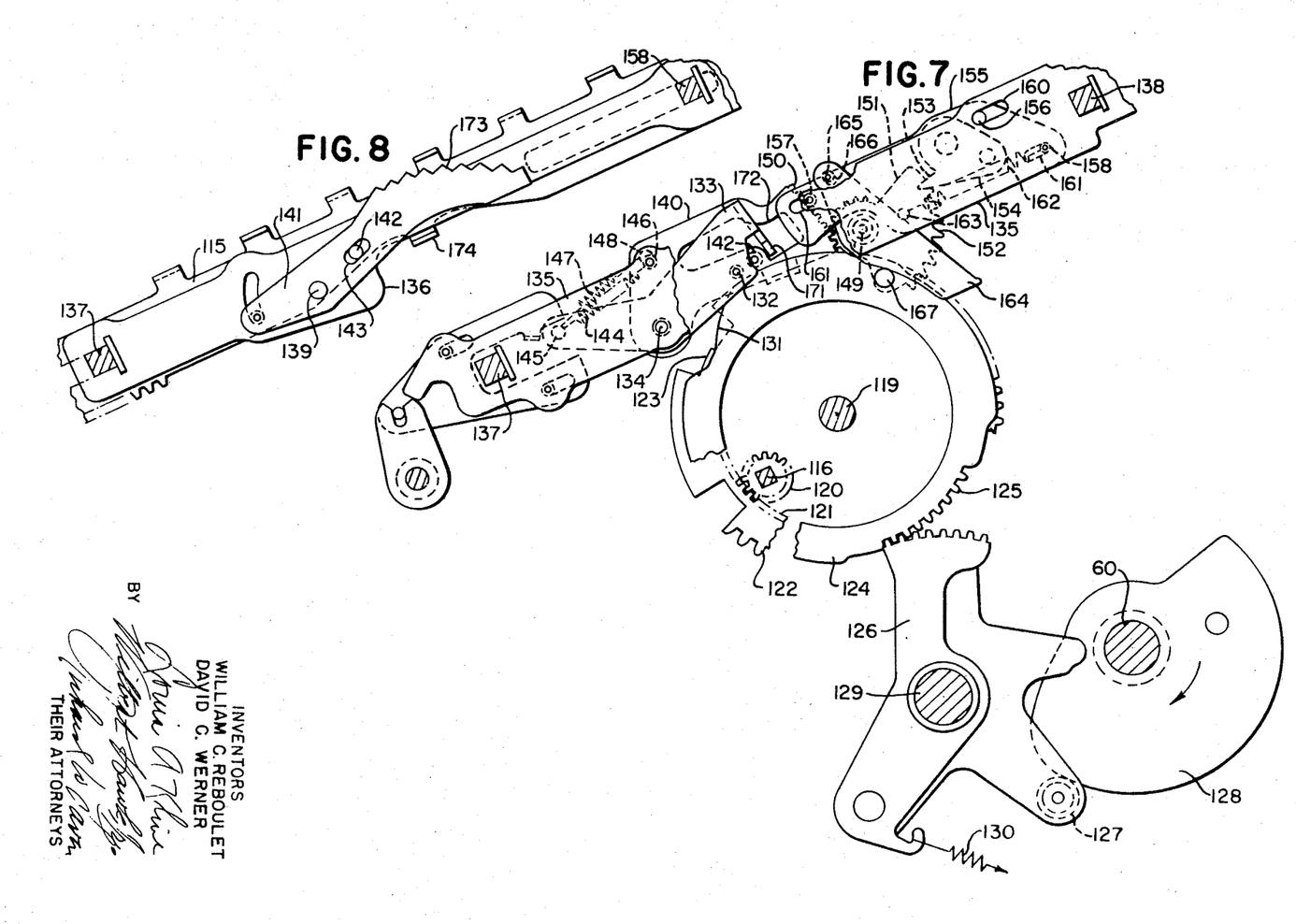
FIG. 7 is a partial detailed side view of the mechanism for automatically positioning the transaction rack members of the machine.
FIG. 8 is a partial detailed side view of the automatic rack stop member and its associated primary transaction rack member.

Referring now to FIGS. 7 and 8, there is shown the automatic cycle control mechanism disclosed in the previously cited Placke et al. U.S. Pat. No. 3,489,341. Reference should be made to that patent for a full explanation of the mechanism. Only that portion of an automatic control mechanism which is needed for an understanding of the present invention will now be given. The mechanism disclosed in FIGS. 7 and 8 functions to automatically set the primary transaction rack 115 (FIG. 8) of each transaction row of keys to a preprogrammed key-representing position during successive machine operations, thereby controlling the functional operation of the machine.

As described previously, the transaction segment 91 (FIG. 4) in each transaction row of keys is rotated by the segment 82 a distance commensurate with the transaction key depressed. As the transaction segment is being rotated, a square shaft 116 (FIG. 4), supported by an internal gear pinion 117, is being turned due to the engagement of the gear pinion 117 with internal gear teeth 118 of the segment 91. By this method, the rotational movement of the segment 91 is transmitted to other segments, located in other parts of the machine. The square shaft 116 extends the width of the machine. As shown in FIG. 7, a pinion 120, supporting the square shaft 116, engages the internal teeth 121 of a selecting plate 122, the square shaft 116 being turned in the manner just described. Thus the selecting plate 122 of each transaction row is set to a position representing the transaction key that is depressed in that transaction row.

The edge of the selecting plate 122 contains a number of control surfaces 123 of varying depths, each surface position representing a transaction key. Rotatably mounted on a shaft 119 adjacent to the selecting plate 122 is a drive segment 124. Located on its edge are a number of gear teeth 125, which are engaged by a cam follower arm 126 rotatably mounted on the shaft 129. The cam follower arm 126 has mounted thereon a roll 127, which is normally urged into engagement with a cam 128 by a spring 130 secured between the cam follower arm 126 and a portion of the machine.

The drive segment 124 also contains a cam surface 131, which cooperates with a stud 132 mounted on a selecting plate feeler 133. The plate feeler 133 is rotatably mounted on a stud 134, which in turn is journaled between a pair of support frames 135, 136. The support frame 135 is broken away in FIG. 7 to show details of the plate feeler 133. Each of the support frames 135, 136 is mounted on a pair of guide bars 137, 138 mounted within the machine framework.

Also rotatably mounted on the stud 134 is a stop-positioning segment 140 (FIG. 7). Mounted on a stud 139 located in the support frame 136 adjacent to the segment 140 is an automatic rack stop member 141 (FIG. 8). The segment 140 has a stud 142, which is positioned within a slot 143 located in the rack stop member 141. A spring 144 (FIG. 7) is connected between a stud 145, mounted on the plate feeler 133, and a stud 146, mounted on the segment 140, for coupling the segment to the feeler in a manner to be described more fully hereinafter. A second spring 147, mounted between the stud 145 and a stud 148, located on the support frame 135, normally biases the feeler 133 clockwise about the stud 134.

The front portion of the stop-positioned segment 140 contains a number of gear teeth 150, which engage the teeth of an index segment 151 rotatably mounted on a stud 149, which in turn is mounted on the support frame 135. The rear portion of the segment 151 contains a number of teeth 152, which connect with the tooth portion 153 of a retaining pawl 154 rigidly mounted on a slide 155.

The slide 155 is supported by a number of studs 156, 157, and 158. The stud 156 is mounted on the slide 155 and is positioned within a slot 160 located in a support frame 135. The other studs 157 and 158 are mounted on the support frame 135 and are positioned within slots 161 in the slide 155. A spring 162 is mounted between the stud 158 and a stud 163, mounted on the slide 155, for normally urging the slide to the right, as viewed in FIG. 7.

Rotatably mounted on the stud 149 is a slide drive arm 164, on which is mounted a stud 165 located at the top of the arm. This stud is positioned within a cutout portion 166 located in the edge of the slide 155. Under the action of the spring 162, the drive arm 164 is normally urged for clockwise movement about the stud 149 by the movement of the slide 155. This clockwise movement is limited by a stud 167 mounted on the drive segment 124.

In the operation of the machine, the operator depresses the amount keys 20 that represent the total to be entered and the appropriate transaction keys that include a motorized key for initiating a machine operation, and a repeat key 23 (FIG. 1) that represents the number of times the amount is to be automatically repeated. Depression of the motorized transaction key results in the rotation of the key lock line 93 (FIG. 6) in a counterclockwise direction, which carries the link 96 towards the left, as viewed in FIG. 6, which initiates a machine operation. The primary racks 115 (FIG. 8) in each of the three transaction rows will move to the left until they contact the stems of the depressed transaction and repeat keys in those rows. This movement is transmitted through the segments 82 and 88 (FIGS. 4) to the secondary rack members 85, the selecting gears 72, and the selecting plate 122 (FIG. 7). The selecting gears 72 on the shaft 73 will be set through the gears 78, 80, and 81 (FIG. 2) in the manner described previously.

After the selecting gears 72 have been set to represent the transaction keys that have been depressed on the keyboard, the cam 58, (FIG. 5) moves the link 53 to the right. This movement results in the clockwise rotation of the arm 49 and the bail shaft 52. The movement of the bail shaft 52 rotates the yoke 45 and, by the action of the spring 50, the feeler arms 47, so that the stud 92 will be moved by the feeler arms to sense the sets of the selecting gears 72 mounted on the shaft 73. If the stud 92 senses a low spot on the gears 72, the feeler arm 47 moves clockwise to position the top portion of the yoke 45 behind the stud 44 (FIG. 4) of its associated drive slide 24. This clockwise movement of the feeler arm 47 is limited by a shaft 29 (FIGS. 3, 4, and 5) mounted between the side plates 27, 28.

As the bail shaft 52 continues its upward movement under the control of the link 53, the yoke 45 will be rocked further counterclockwise about the stud 46. If the yoke member is behind the stud 44, this movement will move the associated drive slide 24 to the left, as viewed in FIG. 4, allowing the slide to be latched by one of the latching rods 37. This movement results in the positioning of a detent slide 71 (FIG. 5), which will lock out all the transaction keys in the transaction row or allow certain of the keys to be operable to control the next machine operation depending on the programming of the machine. In the present situation, all the keys will be locked out.

Movement of the drive slide 24 will also close a switch mechanism 175 (FIGS. 2 and 4) by means of a switch contact 176 actuated by the slide 24. The closing of the switch 175 completes an energizing circuit to the solenoid 111 (FIG. 6), which moves its armature 110 to the left, thereby rocking the lever member 104 counterclockwise about the shaft 105. This movement of the lever member 104 rotates the blocking pawl 101 counterclockwise, thus removing the blocking surface 114 of the pawl from the path of the stud 98 of the link 96, which prevents the link 96 from rocking the key lock line 93 clockwise, thus allowing the machine to continue its operation. This action also allows the amount and print keys that were used in the initial entry of the information on the keyboard to remain depressed, thus allowing the information to be entered during each repeat operation.

If the stud 92 had sensed a high spot (FIG. 5) on the selecting gears 72, the feeler arm 47 would have stopped in a position where the top portion of the yoke 45 would be positioned below the stud 44. Thus further movement of the yoke 45 would have no effect on the drive slide 24.

As described previously, the selecting plates 122 (FIG. 7) in each of the transaction rows will have been set to a position commensurate with the transaction key depressed. After this has occurred, the cam 128 (FIG. 7) rocks the cam follower arm 126 counterclockwise, which movement is transmitted to the drive segment 124, thereby rocking the segment 124 clockwise. This clockwise movement of the segment 124 results in the clockwise rocking of the sensing plate feeler 133, due to the stud 132 moving along the cam surface 131 under the action of the spring 147. The feeler 133 senses one of the control surfaces 123 that has been positioned adjacent to the feeler by the depression of the transaction key. The control surfaces 123 are shown to be at various depths, each representing a transaction key that may be programmed to be operated during the next machine operation. Thus the amount of movement of the feeler 133 in sensing the control surfaces 123 represents the transaction key of the next operation. This movement is transmitted to the stop-positioning segment 140 (FIG. 7) by a lower front flange portion 171 of the feeler 133, which extends through an opening 172 in the segment 140 and engages the segment under the action of the spring 144. Thus the feeler 133 rocks the segment 140 about the stud 134 a distance commensurate with the control surface 134 that is sensed by the feeler. As described previously, the stud 142, mounted on the segment 140, is positioned within the slot 143 (FIG. 8), located in the rack stop 141. It is seen that, through this construction, the movement of the segment 140 by a sensing operation of the feeler 133 is transmitted to the rack stop 141, thereby positioning the rack stop commensurate with the control surface 123 sensed by the feeler.

As shown in FIG. 8, the rack 141 has a number of stop surfaces 173, each corresponding to a transaction key. The positioning of the rack stop 141 positions a stop surface 173, corresponding to the control surface 123 sensed by the feeler 133, in the path of a flange member 174 (FIG. 9) extending from the bottom of the primary rack member 115 of the associated transaction bank. Thus, during the next machine operation, the primary rack member 115 is positioned commensurate with the control surface sensed by the feeler 133. During this second machine operation, the selecting plate 122 (FIG. 7) is again positioned to control the movement of the feeler 133, thereby allowing the machine to operate and control the rack stop 141 to position the primary rack 115 in a predetermined key position during a succeeding machine operation. Thus the position and the type of control surfaces 123 that are programmed in the selecting plate 121 will determine the type of operation that will occur. In a repeat mode, the functional operation of the machine will be the same for each operation.

As shown in FIG. 7 and as disclosed previously, the front of the stop-positioning segment 140 consists of a number of gear teeth 150, which engage an index segment 151, which in turn is normally engaged by the retaining pawl 154 mounted on the slide 155. Upon the clockwise rotation of the drive segment 124, the stud 167, mounted on the segment, allows the slide drive arm 164 to rock counterclockwise under the action of the spring 162, resulting in the movement of the slide 155 and the retaining pawl 154 to the right, as viewed in FIG. 7. This action removes the pawl from engagement with the index segment 161, thereby freeing the index segment for movement by the stop-positioning segment 140. Upon the sensing of a control surface by the feeler 133 in the manner described above, the index segment 151 is rotated by the stop-positioning segment 140 commensurate with the rotation of the feeler 133.

As the cam 128 (FIG. 7) completes its rotation, the cam follower arm 126 is rocked clockwise, thereby rocking the drive segment 124 counterclockwise. This allows the stud 167 to rock the drive arm 164 counterclockwise, which action returns the slide 155 and the retaining pawl 154 to the left, thereby allowing the retaining pawl to engage the index segment 151 and lock it in its adjusted position. This movement also locks the segment 140 and the rack stop 141 in their adjusted positions.

The counterclockwise movement of the drive segment 124 allows the cam surface 131 to rock the feeler 133 counterclockwise about the stud 134 against the action of the springs 144 and 147. This removes the feeler from engagement with the control surfaces 123 of the selecting plate 122, thereby allowing the selecting plates to be adjusted to a new position under the control of the rack stop 141 and the primary rack member 115 of the transaction bank. Thus the mechanism is positioned for the next machine operation.

At the end of the machine operation, the link 96 moves to the right, as viewed in FIG. 6, which would normally rock the key lock line 93 clockwise to stop the operation of the machine. Since the blocking pawl 101 has been rocked counterclockwise by the energization of the solenoid 111, movement of the link 96 at this time has no effect on the key lock line 93, and the machine will be in condition for a further machine operation. Since the autocycle mechanism, as disclosed previously, will control the positioning of the primary rack member 115 (FIG. 8) during the next machine operation, the selecting gears 72 (FIG. 4) will be adjusted, and a new sensing operation by the feeler 47 will occur, as described previously. If there is to be another repeat operation, the sensing feeler 47 will sense a low spot to provide the drive for the drive slides 24. Since the drive slide 124 (FIG. 4) which controls the actuation of the switch 175 is already in a latched actuated position, the drive slide will remain in its latched position to allow the machine to cycle through a further operation. Under these conditions, the machine will continue to cycle until the machine enters the last repeat operation, which corresponds to the numerical designation of the repeat key 23 that was used to initiate the machine operation.

During this last machine cycle of operation, the automatic cycle mechanism will position the primary rack members 115 in such a manner that the selecting gears 72 (FIG. 5) will present a high spot to the feeler arm 47. This will disable the yoke member 45 from moving the drive slide 24. However, the selecting gears 72 associated with the release slide 41 (FIG. 3) will present a low spot to the feeler arm 47, which results in the release slide 41 moving to the left, which cams the latching rods 37 out of engagement with the drive slide 24. This action allows the spring 32 (FIG. 4) to move the drive slide 24 to the right, thereby opening the switch 175, which deenergizes the solenoid 111 (FIG. 6). Deenergization of the solenoid 111 allows the spring 112 to rock the lever member 104 clockwise, which positions the blocking surface 114 of the pawl 101 in front of the stud 98 on the link 96, thereby allowing the link 96 to rock the key lock line 93 clockwise to end the machine operation. Clockwise rotation of the key lock line 93 also allows all of the depressed keys on the keyboard to be restored to their home position.

What is claimed is:

1. In a business machine capable of being operated through a plurality of machine operations, a. means when actuated for initiating a machine operation;

b. means for normally disabling said initiating means at the end of a machine operation;

c. a plurality of differentially settable members settable to a position for actuating said initiating means;

d. a plurality of selectively operated control keys for controlling the operation of the machine a predetermined number of times when actuated;

e. first programming means operated by the actuation of one of said control keys to position said differentially settable members a predetermined number of times according to the actuated control key;

f. second programming means including a control member operated by the positioning of said differentially settable member to move the control member to an actuated position;

g. and means operated by said control member when in an actuated position to disable said disabling means whereby the machine will operate through a predetermined number of machine operations according to the control key that is actuated.

2. The business machine of claim 1 in which said second programming means includes a. a plurality of differentially settable gear members having control surfaces thereon, said gear members being set commensurate with the positioning of said differentially settable members;

b. sensing means mounted adjacent said gear members and adapted for movement to sense the control surfaces on said gear members;

c. and drive means operated by said sensing means, and adapted to engage said control member upon said sensing means sensing a predetermined control surface in each of said gear members whereby said control member is moved to an actuated position.

3. The business machine of claim 2 in which said control member comprises a slide member slidably mounted adjacent said drive means;

latching means engaging said slide member and adapted to latch said slide member when in an actuated position;

and said disabling means includes an electromagnetic member adapted when energized to disable said disabling means;

and switch means operated by said slide member when in an actuated position to energize said electromagnetic member whereby said disabling means is disabled from operation.

4. The business machine of claim 3 in which said control member comprises a release slide member having actuating portions located adjacent each of said latching means whereby, upon movement of said release slide member to an actuated position, the actuating portions will engage said latching means and move them to an unlatched position, thereby allowing said slide member to return to its home position.

5. The business machine of claim 2 which includes a. lockout means mounted adjacent said control keys and adapted for movement to an operated position, thereby locking the control keys in place;

b. and means interconnecting said lockout means and said control member whereby, upon movement of said control member to an actuated position, said lockout means is moved to an operated position.

6. The business machine of claim 3 in which said initiating means includes a rotatably mounted blocking member;

said disabling means includes an actuating member having a stop portion positioned adjacent said blocking member, said actuating member adapted to be moved whereby said stop portion engages and actuates said blocking member, thereby disabling said initiating means;

and means engaging said blocking member and said electromagnetic member whereby, upon energization of said electromagnetic member, said blocking member is rotated out of engagement with said stop portion.

7. In a business machine capable of being operated through a plurality of machine operations and having amount keys and transaction keys for operating the machine to enter amounts, set up by the depression of certain of the amount keys, into the machine, a. means adapted for initiating a machine operation and to lock the depressed amount key in position when moved to an operated position;

b. drive means mounted adjacent said initiating means and adapted, at the end of a machine operation, to disable said initiating means, thereby stopping said machine operation and restoring all depressed amount keys;

c. a plurality of selectively operated control keys for controlling the operation of the machine a predetermined number of times when actuated;

d. a plurality of differentially settable control members settable to a position commensurate with a depressed transaction key for moving said initiating means to an operated position, whereby the amount set up on the depressed amount keys is entered into the machine;

e. first programming means operated by the actuation of one of said control keys for positioning said differentially settable members a predetermined number of times as controlled by the actuated control keys;

f. means mounted adjacent said drive means adapted, when operated, to disable said drive means from disabling said initiating means;

g. and second programming means actuated by the positioning of said differentially settable members to a predetermined position for operating said disabling means whereby said initiating means will operate the machine through a predetermined number of machine operations as determined by the actuated control key.

8. The business machine of claim 7 in which said second programming means includes a. a plurality of rotatably mounted gear members having first and second control surfaces located thereon, each of said gear members adapted to be set to a position commensurate with the position of a corresponding one of said differentially settable members;

b. rotatably mounted sensing means mounted adjacent the plurality of said gear members and adapted, when operated, to sense said first and second control surfaces whereby, upon sensing said first control surface on each of said gear members, the sensing means is rotated to an actuated position;

c. a first drive member slidably mounted adjacent said sensing means and adapted, when moved to an actuated position, to operate said disabling means;

d. an actuating member mounted on said sensing means and adapted, when said sensing means is rotated to an actuated position, to move said drive member to an actuated position;

e. and means for operating said sensing means during each machine operation whereby, upon said sensing means sensing a first control surface on each of said gear members, said disabling means is operated.

9. The business machine of claim 8 in which said drive member contains a latching surface thereon;

a latching member mounted adjacent the latching surface on said drive member;

and resilient means engaging said latching member and urging said latching member into engagement with said drive member whereby, upon movement of said drive member to an actuated position, said latching member will engage said latching surface and latch said drive member in the actuated position.

10. The business machine of claim 9 in which said second programming means includes a slidably mounted second drive member having an engaging surface positioned adjacent said latching member;

a. second sensing means mounted adjacent said gear member, said second sensing means being operated by said operating means to sense said first and second control surfaces in each of said gear members, whereby, upon sensing said first control surface, the second sensing means is moved to an actuated position;

b. and means interconnecting said second drive member and said second sensing means whereby, upon movement of the second sensing means to an actuated position, said second drive member is moved to allow the engaging surface to engage said latching member, thereby unlatching said first drive member.

* * * * *